(12) United States Patent
Tallamraju et al.

(10) Patent No.: US 8,798,391 B2
(45) Date of Patent: Aug. 5, 2014

(54) METHOD FOR PRE-PROCESSING AN IMAGE IN FACIAL RECOGNITION SYSTEM

(75) Inventors: Ravindra Babu Tallamraju, Karnataka (IN); Subrahmanya Sreenivasan Venkateshaiah, Karnataka (IN); Chethan Shikaripur Annajirao Danivas, Karnataka (IN); Mahalakshmi Kalmanje, Bellary (IN); Pavitra Chandrappa, Ramanagara (IN)

(73) Assignee: Infosys Limited, Bangalore (IN)

( * ) Notice: Subject to any disclaimer, the term of this patent is extended or adjusted under 35 U.S.C. 154(b) by 266 days.

(21) Appl. No.: 13/241,786

(22) Filed: Sep. 23, 2011

(65) Prior Publication Data
US 2012/0301020 A1 Nov. 29, 2012

(30) Foreign Application Priority Data

May 23, 2011 (IN) ............................ 1732/CHE/2011

(51) Int. Cl.
*G06K 9/40* (2006.01)
*G06K 9/62* (2006.01)

(52) U.S. Cl.
USPC ............................................. 382/268; 38/224

(58) Field of Classification Search
USPC ......... 382/154, 162, 164, 165, 167, 173, 190, 382/224; 358/515, 518, 520, 530; 345/49, 345/150, 199; 348/586, 589–593
See application file for complete search history.

(56) References Cited

U.S. PATENT DOCUMENTS

| | | | | |
|---|---|---|---|---|
| 5,852,673 A | * | 12/1998 | Young | 382/164 |
| 6,266,442 B1 | * | 7/2001 | Laumeyer et al. | 382/190 |
| 6,714,257 B2 | * | 3/2004 | Roever | 348/590 |
| 2010/0111417 A1 | * | 5/2010 | Ward et al. | 382/173 |
| 2012/0301020 A1 | * | 11/2012 | Tallamraju et al. | 382/165 |
| 2013/0127824 A1 | * | 5/2013 | Cohen et al. | 345/419 |

\* cited by examiner

*Primary Examiner* — Amir Alavi
(74) *Attorney, Agent, or Firm* — Occhiuti & Rohlicek LLP (57) ABSTRACT

A method preprocessing scheme that improves classification accuracy of a face recognition system comprises identifying a plurality of edges of an image. The method further comprises step of identifying a plurality of discontinuities in the plurality of edges of the image. Furthermore, the method also comprises generating contiguous outline for the image. The last step of the method comprises filling a background of the image with at least one color.

13 Claims, 11 Drawing Sheets

METHOD FOR PRE-PROCESSING AN IMAGE IN FACIAL RECOGNITION SYSTEM

TECHNICAL FIELD

The present disclosure relates to a novel preprocessing scheme that improves classification accuracy of a face recognition system.

BACKGROUND

Figure 2:
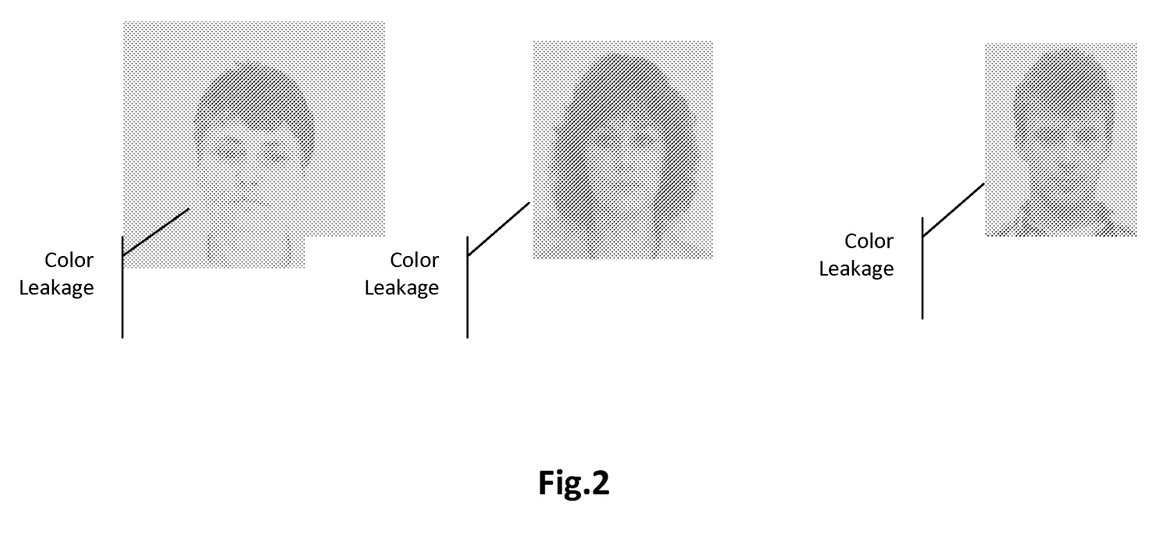
FIG. 2 is an illustrative drawing of sample images having color leakage considered from PICS[1] database.

Face Recognition is a challenging task with challenges emanating from illumination, pose, background, scale and shadow etc. Each of them affect classification accuracy. Apart from these challenges, color leakage of an input image, as depicted in FIG. 2, results into significant reduction in classification accuracy. Also, it was noted through experimentation that background color impact classification accuracy. We address both the challenges in the proposed invention. In the present disclosure, the images available in public domain are considered to illustrate the approach and use a novel method of preprocessing to improve classification accuracy. The proposed scheme works irrespective of pose, orientation and illumination of input image.

SUMMARY OF THE INVENTION

Automatic Face Recognition is an active research area. The challenges include pose, illumination, background clutter, ageing, etc. There are many approaches to extract face in the presence of background. We present a method wherein we extract face in the presence of color leakages which otherwise cause loss of accuracy in classification. To illustrate we make use of a public domain image database.

Aspects of the disclosure relate to a method a novel preprocessing scheme that improves classification accuracy of a face recognition system.

According to the one embodiment of the present disclosure, a method for preprocessing scheme that improves classification accuracy of a face recognition system comprises identifying a plurality of edges of an image. The next step of the method comprises identifying a plurality of discontinuities in the plurality of edges of the image. Identifying the plurality of edges of an image also comprises preventing the at least one color being applied on the entire image. The at least one color can be in the range of about 0-255. The color can be but not restricted to gray color. The present embodiment of the disclosure also comprises generating contiguous outline for the image. The step of generating contiguous outline for the image also comprises generating contiguous outline for the image using linear interpolation method. The final step of the present embodiment comprises filling a background of the image with at least one color. The color can be but not restricted to gray color. The present disclosure also comprises generating the plurality of edges to the image using standard algorithms. After the plurality of edges are generated an outline for the images are generated. The present disclosure also comprises, receiving an image from multiple sources which includes but not restricted to an image database or an image from a user. The present disclosure also includes a step of isolating a face portion of the image.

DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The detailed description presented in the current section is intended to enable any person skilled in the art to make and use the invention, and is provided in the context of specific applications and their requirements. Necessary modifications to preferred embodiments will readily be apparent to those skilled in the art, and generic formulations defined herein may be applied to other embodiments and applications without departing from the spirit and scope of the invention. Moreover, in the following discussion, a number of details are set forth for the purpose of explanation. However one of the ordinarily skill in the art will realize that the invention could be practiced without the use of the above specific details. In other instances, well-known structures and devices are shown in block diagram form in order not to obscure the description of the invention with unnecessary detail. Thus the present is not intended to be limited to the embodiments shown, but is to be accorded the widest scope consistent with the principles and features disclosed herein.

Figure 1A:
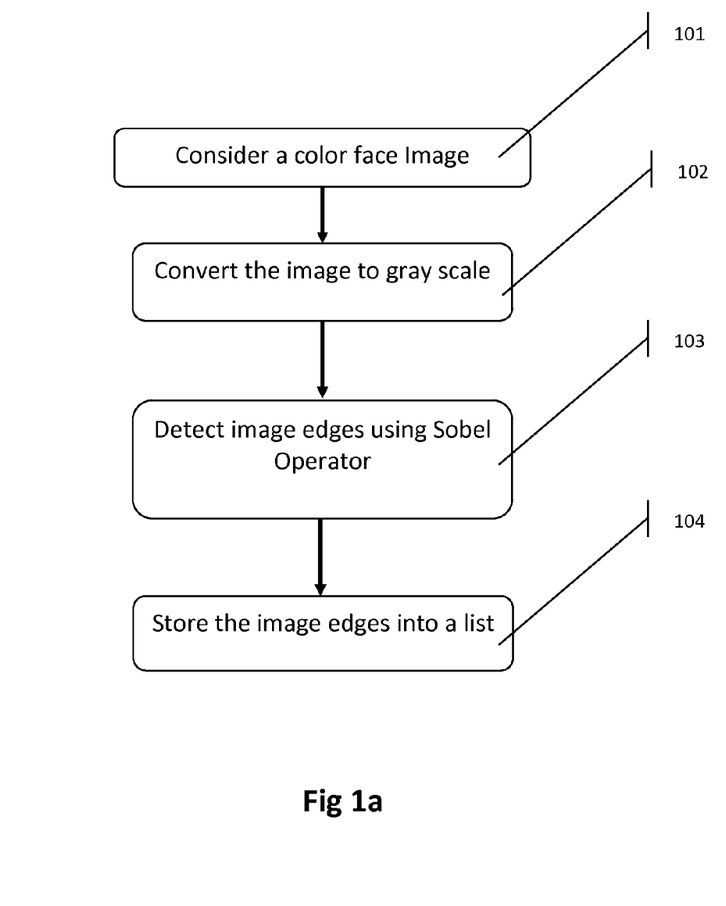
FIG. 1a is an illustrative drawing of computation of edges using Sobel operator.

FIG. 1a is an illustrative drawing of edge detection using Soble operator. As noted in 101, consider a color face image. For illustration, we consider image with single face image. Convert the image to gray scale as noted in 102. Using Sobel operator, compute edges of the given face image, 103. Store the image edges into a list as in 104.

Figure 1B:
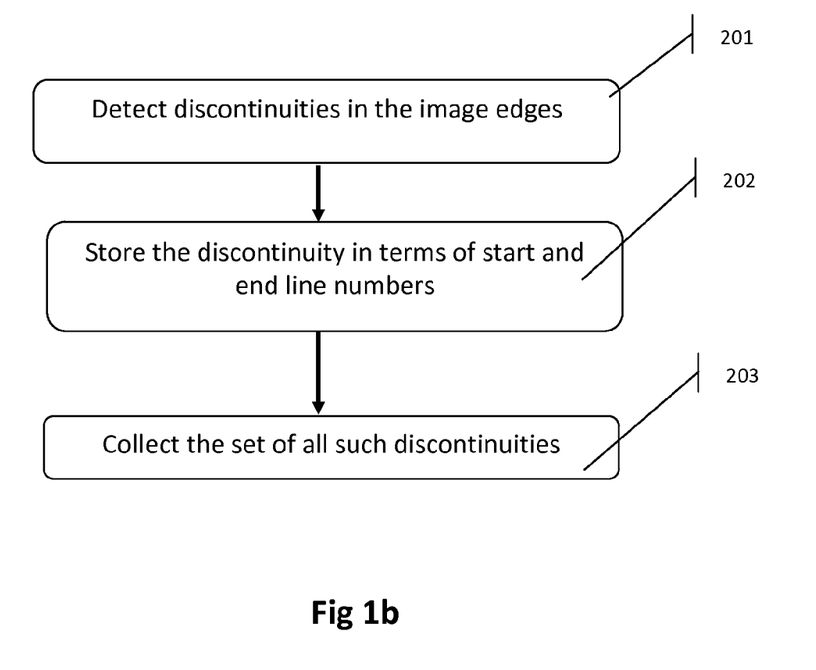
FIG. 1b is an illustrative drawing of identification of discontinuities in edges
Figure 3:
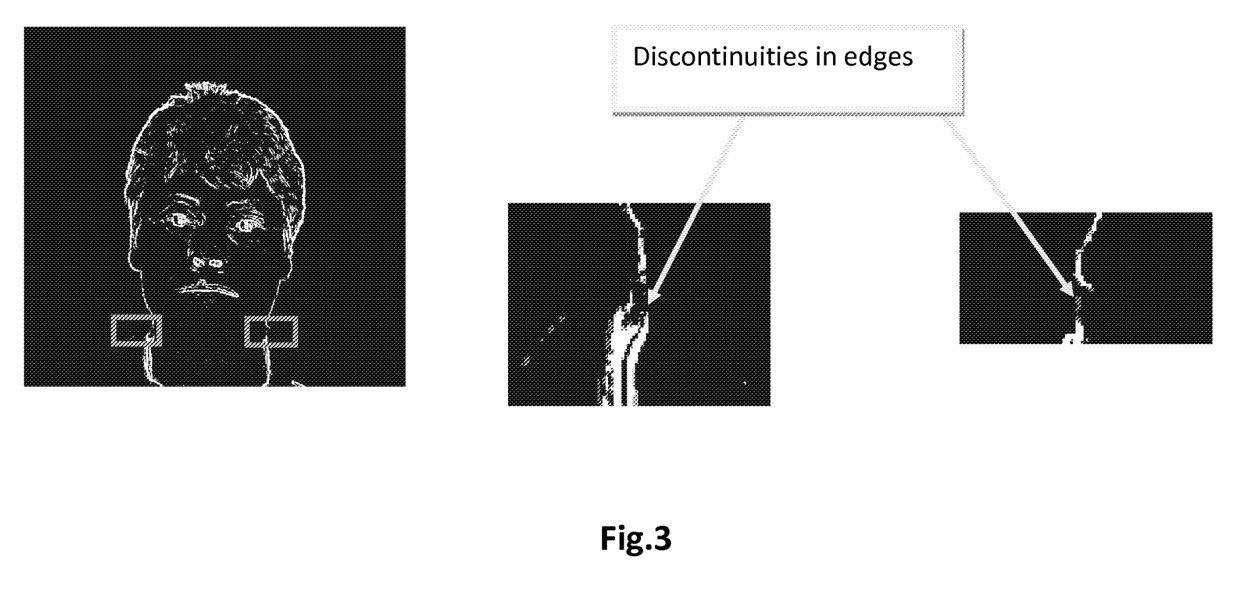
FIG. 3 is an illustrative drawing of discontinuities in edges of an image.

FIG. 1b is an illustrative drawing of scheme for identification of discontinuities in edges. Ideally, depending on the image gradient edge pixels are identified for every line. For the same reason of gradient, it is possible that the edges are not identified for one or more lines. In the current illustration we identify all such groups of lines and pixels for which edges are not identified. FIG. 3 depicts example of discontinuous in the detected edges. As noted in 201, Empirically, since start of the image, every line will normally have two edges $(l_k, p_1)$ and $(l_k, p_2)$ for each line $l_k$ that contains face image. However, practically, it is observed that there would be discontinuities in the edges Identify those groups of continuous lines that do not have edge pixel identified. Store the set of discontinuities in terms of start and end line and pixels, 202. Collect sets of all such discontinuous groups of lines as noted in 203.

Figure 1C:
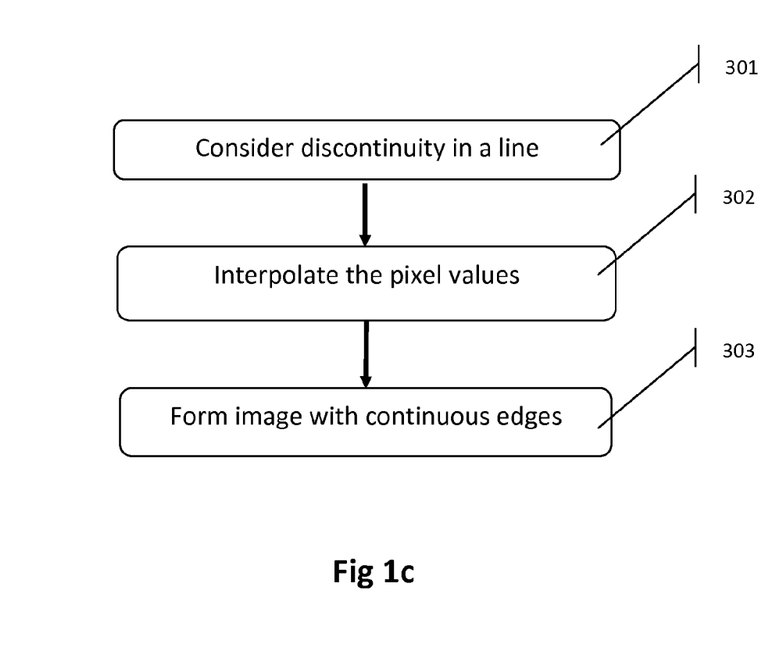
FIG. 1c is an illustrative drawing of interpolation of edges

FIG. 1c is an illustrative drawing of computing missing edge pixels through interpolation. The objective of entire exercise to isolate the given image from the background and fill the background with a gray scale that helps classification better. In this process, as noted in 301, consider set of all start and end lines between which discontinuity is noted. We use linear interpolation to compute pixel number for each of the line numbers that lie between the start and end lines of each discontinuous pair of lines, 302. The original edge output together with interpolated pixels for the missing lines forms the complete set of detected edges using Sobel operator, as noted in 303.

Figure 1D:
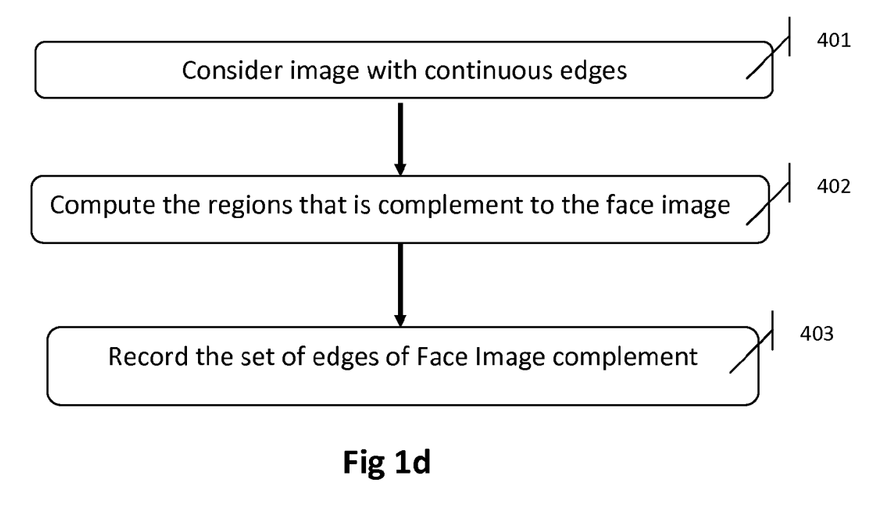
FIG. 1d is an illustrative drawing of set of edge pixels that form complement of input image edge pixels

FIG. 1*d* is an illustrative drawing of generating complement set of edge output. As noted in 401, we consider edge output as available in 303 for further processing. We compute the set of all pixels that form complement to given face image. The objective is to fill up such identified region with a common gray color. The process of identification of the region is described in 402. Let the given image contain line numbers, say, $1_{start}$ to $1_{end}$. Depending on the location of the face in the image, there will be one or two pairs of start and end pixels in a line. For example, as noted in FIG. 4, line AB refers to the region where face image is not available. Thus it has one pair of line and pixels. In case of line CD, there will be two sets pairs of line and pixels corresponding to the line segments CE and FD. Segment EF is computed using edge detector as discussed through drawing so far. We record the set of edges that form the complement set in FIG. 1*d*, 403.

Figure 1E:
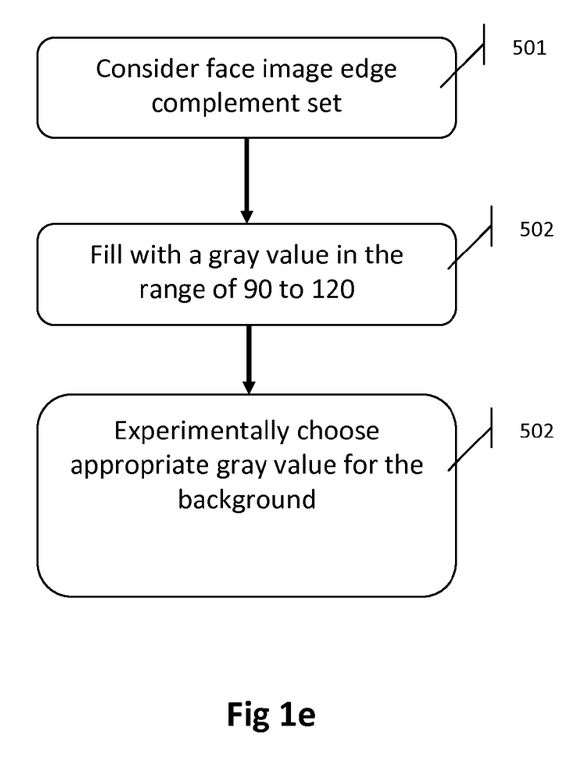
FIG. 1e is an illustrative drawing of background fill with a given gray
Figure 5:
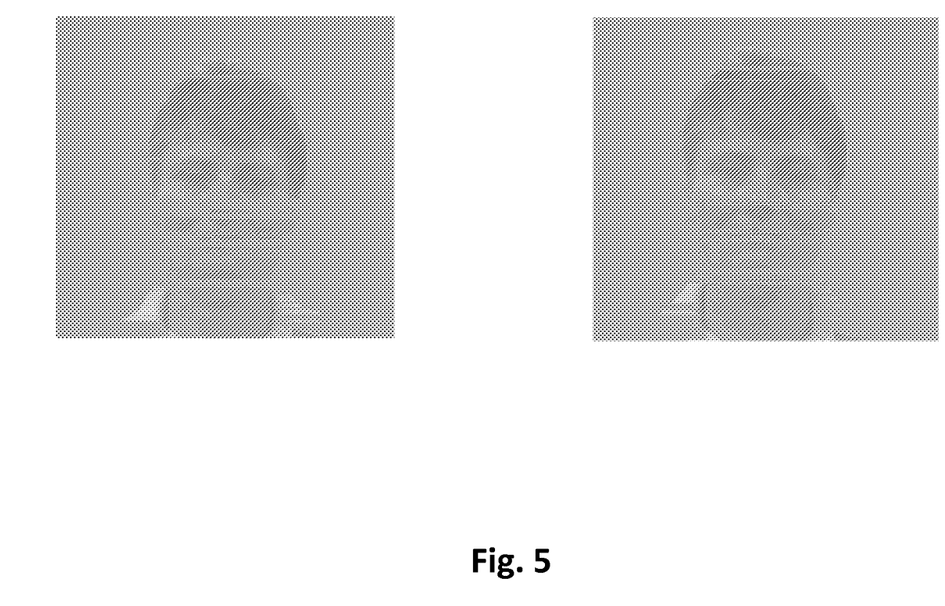
FIG. 5 is an illustrative drawing of background fill without interpolation of edges.
Figure 6:
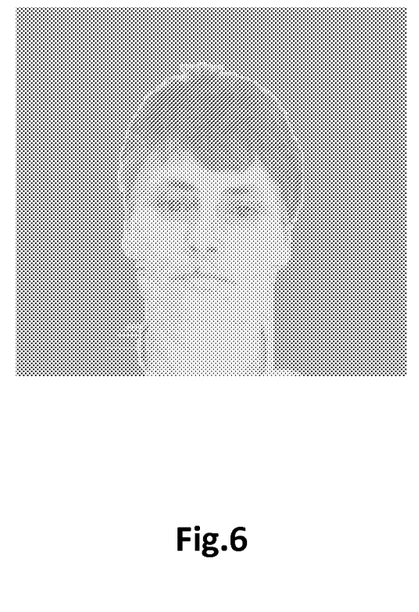
FIG. 6 is an illustrative drawing of background fill of an image with interpolated edges.

FIG. 1*e* is an illustrative drawing of background fill or equivalently color fill of complement region identified in FIG. 1*d*. FIG. 5 is an illustrative drawing of filling background color without resorting to interpolation. As noted in 501, we consider the complement set as noted in 403. Fill the set of pixels with a common gray value, 502. Carry out experiments with face recognition using Eigenfaces method to find optimal gray color that maximizes classification accuracy of the system. It was found the best classification accuracy is obtained with a gray color value of 90. FIG. 6 is an illustrative example of color fill after discontinuity in detected edges is taken care.

FIG. 2 is an illustrative drawing of sample images having color leakage considered from PICS[1] database. It contains three images illustrating color leakage into the background.

FIG. 3 is an illustrative drawing of discontinuities in edges of an image. The figure contains three images. From left to right, the first image depicts discontinuities in the edges in the form of blue and red rectangles; the second and third images are zoomed version of discontinuities in the blue and red rectangles respectively.

Figure 4:
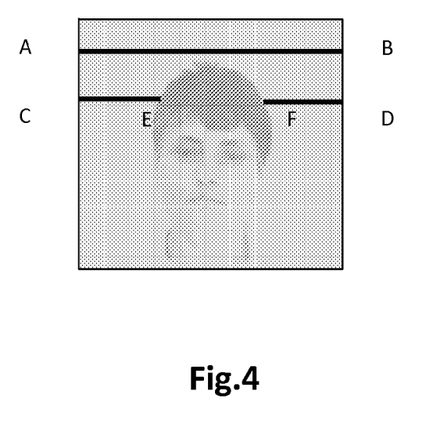
FIG. 4 is an illustrative drawing of Identification of Region that excludes face image.

FIG. 4 is an illustrative drawing of Identification of Region that excludes face image.

FIG. 5 is an illustrative drawing of background fill without resorting to interpolation of pixels.

FIG. 6 is an illustrative drawing of background fill of an image with interpolated edges.

Figure 7:
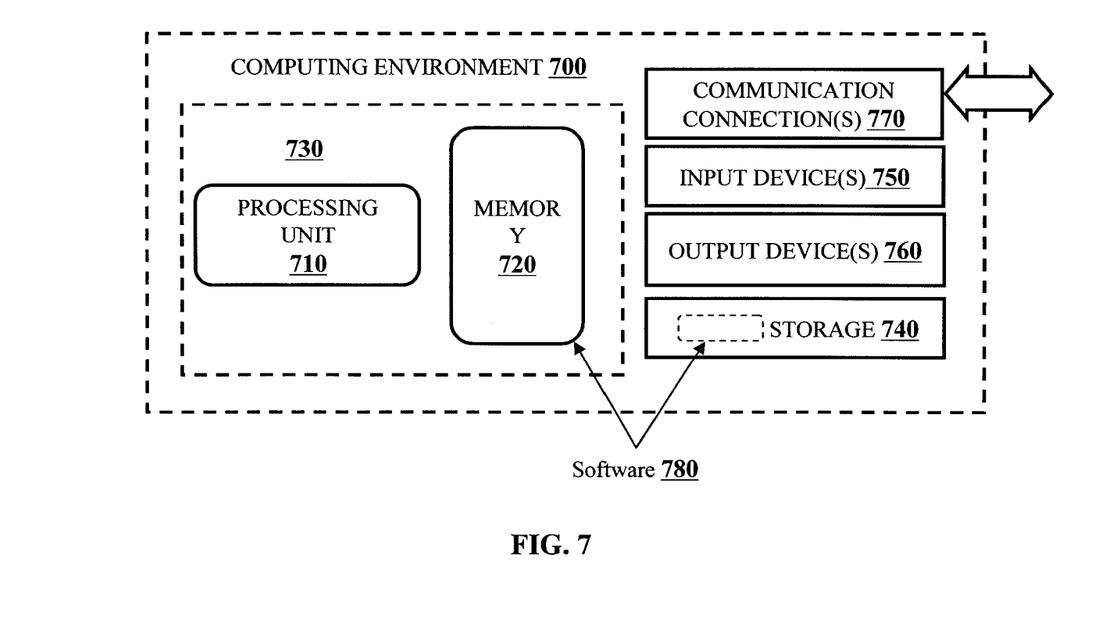
FIG. 7 shows a computing environment.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which may be used to store information and which may be accessed within the computing environment 700. In some embodiments, the storage 740 stores instructions for the software 780.

The input device(s) 750 may be a touch input device such as a keyboard, mouse, pen, trackball, touch screen, or game controller, a voice input device, a scanning device, a digital camera, or another device that provides input to the computing environment 700. The output device(s) 760 may be a display, a television, a hand held device, a head mounted display or a Kiosk that provides output from the computing environment 700.

The communication connection(s) 770 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 700, computer-readable media include memory 720, storage 740, communication media, and combinations of any of the above.

The sequence of instructions as explained in the method steps may include a program code adapted for identifying a plurality of edges of an image. The sequence of instructions comprises program code adapted for identifying a plurality of discontinuities in the plurality of edges of the image. The sequence of instructions further comprises program code adapted for generating contiguous outline for the image. Furthermore, the present disclosure also comprises program code adapted for filling a background of the image with at least one color.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method for improving classification accuracy of a face recognition system, said method comprising
   identifying a plurality of edges of an image,
   identifying a plurality of discontinuities in one or more edges of said identified plurality of edges of said image, wherein said discontinuities in said one or more edges correspond to missing edge pixels,
   computing said missing edge pixels, and
   generating a contiguous outline for said image using said computed pixels and said identified plurality of edges, from said contiguous outline, computing a set of pixels that complements said image, and filling said computed set of pixels with gray to maximize classification accuracy of said face recognition system.

2. The method of claim 1, further comprising generating said plurality of edges to said image using the Sobel operator.

3. The method of claim 1, further comprising receiving said image.

4. The method of claim 1, wherein identifying said plurality of discontinuities in said plurality of edges of said image further comprises preventing said gray from being applied to the entire image.

5. The method of claim 1, wherein said contiguous outline for said image is generated using linear interpolation.

6. The method of claim 1, further comprising isolating a face portion of said image.

7. The method of claim 6, further comprising applying at least one color to said image, wherein a value of said at least one color is in a range of about 0 to 255.

8. A computer program product a non-transitory computer-readable medium having instructions encoded thereon for enabling a processor to perform the operations of identifying a plurality of edges of an image, identifying a plurality of discontinuities in one or more edges of said identified plurality of edges of said image, wherein said discontinuities in said one or more edges correspond to missing edge pixels, computing said missing edge pixels and generating a contiguous outline for said image using said computed pixels and said identified plurality of edges, from said contiguous outline, computing a set of pixels that complements said image, and filling said computed set of pixels with gray to maximize classification accuracy of said face recognition system.

9. The computer program product of claim 8, wherein said instructions further comprise instructions for generating said plurality of edges to said image using the Sobel operator.

10. The computer program product of claim 8, wherein said instructions further comprise instructions for receiving said image.

11. The computer program product of claim 8, wherein said instructions further comprise instructions for preventing gray from being applied on said entire image.

12. The computer program product of claim 8, wherein said instructions further comprise instructions for generating said contiguous outline for said image using linear interpolation.

13. The computer program product of claim 8, wherein said instructions further comprise instructions for isolating a face portion of said image.

\* \* \* \* \*